Feb. 2, 1932.  G. L. CANTWELL  1,843,106
ELECTRIC SWITCH
Filed Jan. 6, 1930   3 Sheets-Sheet 1
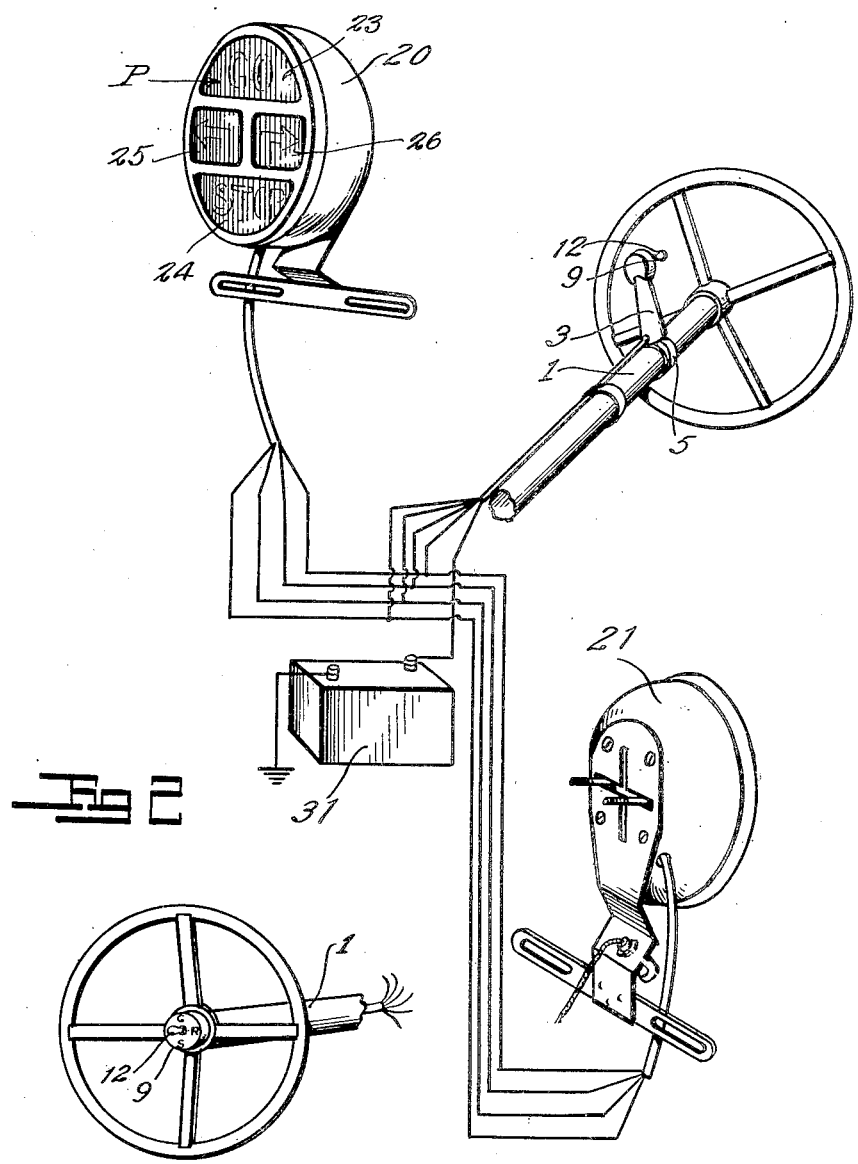
INVENTOR
George L. Cantwell
BY
ATTORNEYS.

Feb. 2, 1932. G. L. CANTWELL 1,843,106
ELECTRIC SWITCH
Filed Jan. 6, 1930 3 Sheets-Sheet 2
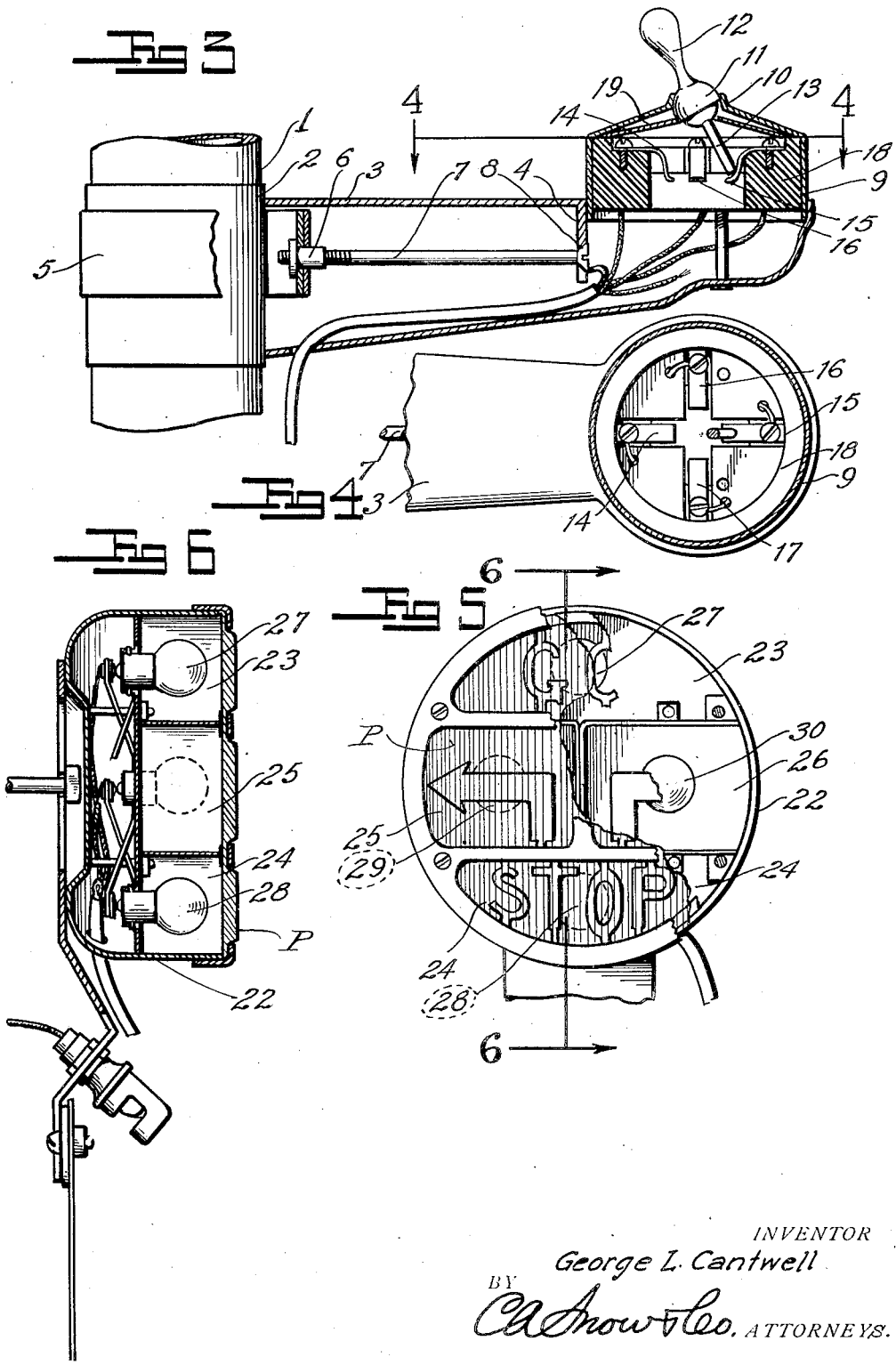
INVENTOR
George L. Cantwell
BY
CA Snow & Co. ATTORNEYS.

Feb. 2, 1932.   G. L. CANTWELL   1,843,106
ELECTRIC SWITCH
Filed Jan. 6, 1930   3 Sheets-Sheet 3
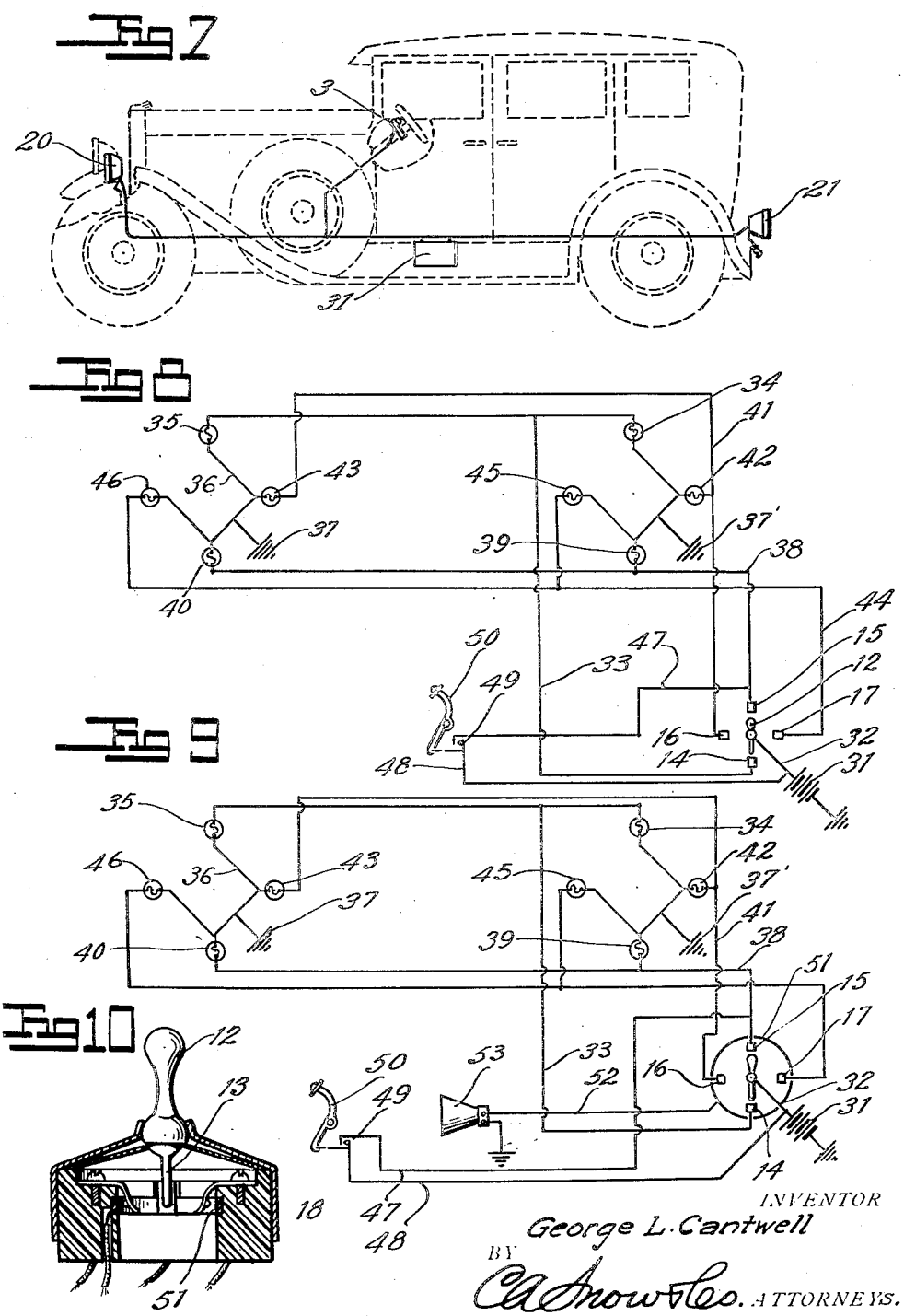
INVENTOR
George L. Cantwell
BY
CA Snow & Co. ATTORNEYS.

Patented Feb. 2, 1932

1,843,106

UNITED STATES PATENT OFFICE

GEORGE L. CANTWELL, OF WICHITA, KANSAS; JENNIE J. CANTWELL, ADMINISTRATRIX OF SAID GEORGE L. CANTWELL, DECEASED, ASSIGNOR TO THE CANTWELL ELECTRIC AUTO SIGNAL CO., OF WICHITA, KANSAS

ELECTRIC SWITCH

Application filed January 6, 1930. Serial No. 418,937.

This invention relates to an electric switch for automobile signals and the primary object of the invention is to provide a signal which may be conveniently operated from a suitable point adjacent to the steering wheel column so the driver can operate the signal without losing control of the steering wheel. I prefer to arrange the signal mechanism in such a way that duplicate signals will be visible either from the front or the rear of the motor vehicle and I also provide means whereby, in addition to the visible signal or signals, an audible signal may be caused to sound an alarm to attract the attention of persons within a certain distance of the motor vehicle equipped with the signal, it being understood that the audible signal can be sounded at the will of the operator whenever the visible signal circuit is closed but that the closing of the visible signal circuit does not necessarily cause the audible signal to operate. The audible signal will ordinarily be the horn on the motor vehicle but it need not necessarily include the horn.

A further object is to provide the signal with a selective switch of novel construction.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred forms of the invention have been shown.

In said drawings,

Figure 1 is a perspective diagrammatic view showing the general arrangement of the parts of the system.

Figure 2 is a top view of the steering wheel showing part of the steering column with the signal switch directly connected thereto.

Figure 3 is a sectional view through the selective switch and the switch bracket secured to the steering column.

Figure 4 is a sectional view on the line 4—4, Figure 3.

Figure 5 is a face view of the visible signal, part of the panel being broken away.

Figure 6 is a sectional view on line 6—6, Figure 5.

Figure 7 is a view showing the arrangement of the signals applied to the motor vehicle, the motor vehicle being shown in dotted lines.

Figure 8 is a diagrammatical view of the wiring system.

Figure 9 is a diagram of a modified form of wiring system.

Figure 10 is a sectional view through a modified form of switch.

On the steering column 1 is an insulating band 2 adapted to be engaged by the recessed end of a hollow bracket arm 3 having a depending lip 4. A ring 5 surrounds the insulating band 2 and carries a nipple 6 in which is threaded a rod 7 having a head 8 abutting against the lip 4 so that by screwing the rod 7 the head 8 will force the arm 3 rigidly against the insulating band 2 on the steering column.

The bracket arm 3 carries a switch housing or shell 9 having a top opening provided with a lip 10 to receive the ball 11 on the switch arm 12. The switch arm has a finger 13 to engage any one of the four spring contact fingers 14, 15, 16, and 17 to close the circuits for "go", "stop", "right", and "left", as hereinafter explained. The contact fingers are connected to an insulating block 18 in the shell and each in turn is connected to a wire of one of the four circuits mentioned. The switch arm is held in any set position by the spring fingers 19 carried by the block 18. That is, when the handle of the switch lever 12 is in a vertical position, it will be out of contact with any of the contact fingers but when it is moved at an angle as shown in Figure 3, it will engage one of the contact fingers to close a circuit to indicate through the visible signal or signals the intention of the driver with respect to the motor vehicle.

The visible signals 20 and 21 will be arranged preferably at the front and rear of the motor vehicle and they will be wired in parallel so that they will be illuminated at the same time. Each signal consists of a shell or housing 22 divided into four separate compartments 23, 24, 25 and 26 with a panel P of transparent or translucent material over the compartments. Each compartment will have a light source, such as a lamp indicated at 27, 28, 29, and 30, with suitable indicia on the panel P for each compartment to indicate "Go", "Stop", "Right", and "Left". The switch arm or lever 12 will be connected to a suitable source of electrical energy, such as a secondary battery 31, through a wire 32 so that when it engages contact 14, current will flow through the wire 33 to lamps 34 and 35 through wire 36 and then to ground 37. When the switch finger contacts with contact 15, the current will flow through wire 38 to lamps 39 and 40 to ground connections 37 and 37' to illuminate the "stop" signals. When the switch finger contacts with contact 16, current will flow through wire 41 to lamps 42 and 43 to illuminate the "right" signals and, when contact finger engages finger 17, current will flow through wire 44 to lamps 45 and 46 to illuminate the "left" signals, it being understood that all of the lamp circuits are grounded through 37 and 37'. In the "stop" circuit is a conductor 47 connected to the secondary battery by a wire 48, there being a circuit breaker 49 in the circuit adapted to be closed by the foot pedal 50 for the brake so that when the brake is applied, the "stop" circuit will be energized to show the "stop" signal. Therefore, whenever the brake is applied, the "stop" signal will be energized independently of the manual control 12.

In Figure 10 I have shown a slightly modified form of manual control switch in which a conductor ring 51 is set in the block 18 adjacent to the contact fingers. This ring is adapted to be connected to the horn circuit 52 shown in diagram in Figure 9 so that when the contact finger 13 is pressed against any one of the contacts 14, 15, 16, and 17, the visible signal will flash or become illuminated but, if it is desired to energize the audible signal, such as the horn 53, sufficient pressure will be exerted on the switch arm 12 to force the particular contact finger against which the switch finger is pressing, to engage the ring so that both the visible signal and the audible signal will be energized. As a result, the light for the visible signal will be illuminated and, by the sounding of the audible signal, persons within the vicinity of the car will be apprised of the fact that the driver is about to stop, go, or turn.

As heretofore stated, the visible signals can each be energized without energizing the audible signal but whenever the driver deems it expedient, he can energize both the visible and audible signal.

It will therefore be seen that the driver can indicate either by a visible signal or set of signals or by a visible signal or set of signals and an audible signal his intention prior to manipulating the car either in going forward, stopping, starting or turning either to the right or to the left.

The switch device used in connection with the arrangement shown in Figures 9 and 10 can be mounted as shown in Figures 1 and 3 although, if preferred, it can be applied to the top of the steering column as shown in Figure 2 but the circuit arrangement will be substantially like that shown in Figure 8 except for the audible signal circuit.

What is claimed is:

1. A switch including separate resilient contacts for electrical connection to different circuits, a switch member tiltable into engagement with any one of the contacts to close its circuit, and means controlled by each of the contacts, when subjected to excessive pressure, for closing a second circuit, said means including a contact normally spaced from but extending across the first named contact.

2. A switch including an annular series of resilient contacts insulated from each other, a conductor adjacent to but normally spaced from the contacts, and a movable switch member for engaging any one of the contacts to close a circuit, said member constituting means for shifting the contact into engagement with the conductor adjacent thereto, thereby to close another circuit.

3. A switch of the class described including a housing having a conical top provided with an opening, a block seated in the housing and formed of insulating material, said block having slots converging toward the center thereof, spring contact fingers supported in the respective slots, a contact ring carried by the block and surrounding but normally spaced from the depending portions of the fingers, a ball mounted in the opening of the housing, spring means carried by the block and bearing against the ball to hold it against unrestrained rotation, a switch arm extending from the ball and through the opening, a finger depending from the ball and movable against any one of the contact fingers to close a circuit therethrough, any one of said fingers being shiftable by the finger on the ball to engage the ring and close a second circuit.

In testimony that I claim the foregoing as my own, I have hereto affixed my signature.

GEORGE L. CANTWELL.